Patented Oct. 23, 1934

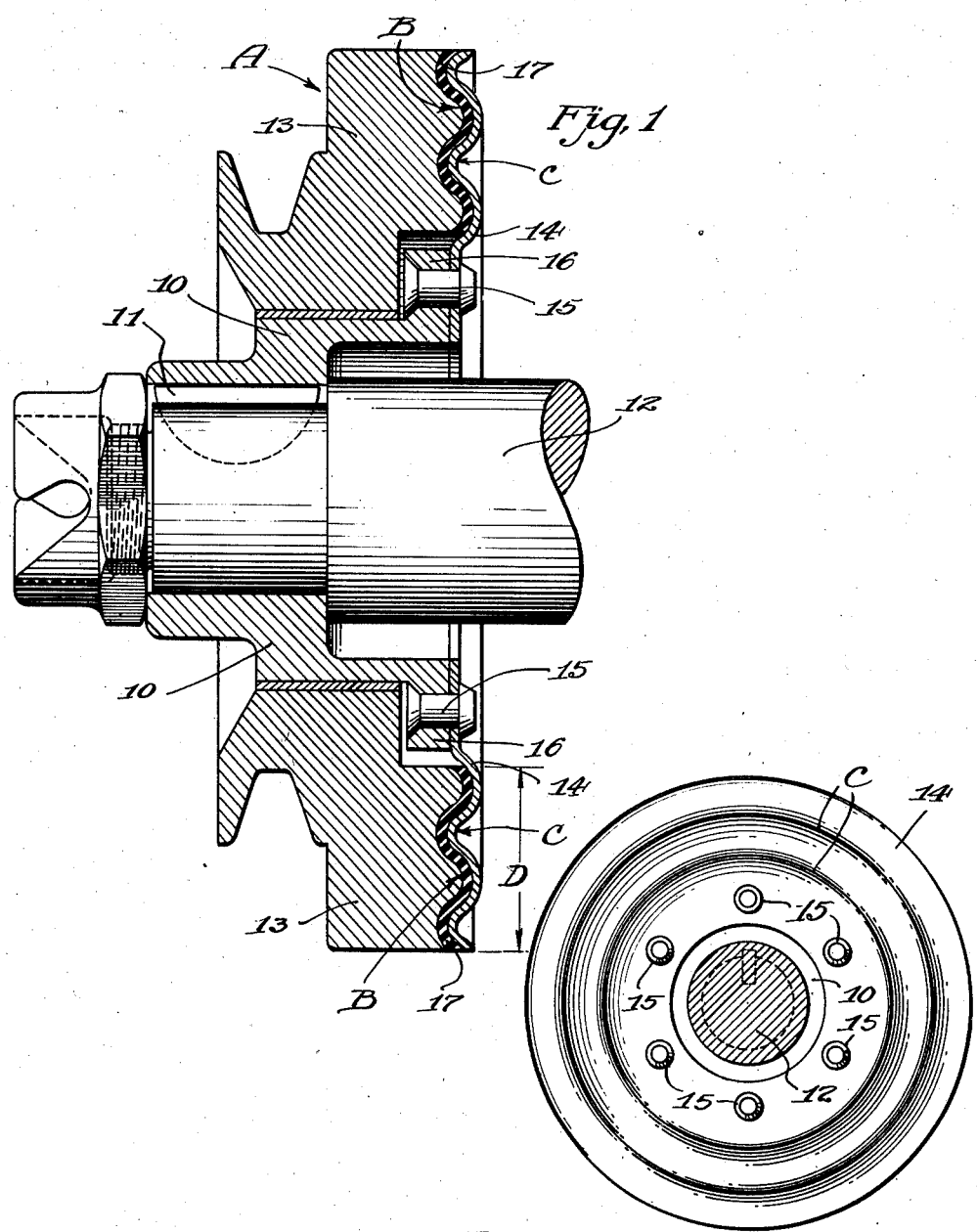

1,978,199

UNITED STATES PATENT OFFICE 1,978,199

VIBRATION DAMPER

William W. Harris, Detroit, Mich., assignor to Continental Motors Corporation, Detroit, Mich., a corporation of Virginia Application December 4, 1931, Serial No. 578,956

6 Claims. (Cl. 74—574)

This invention relates to vibration dampers of the type used on engine crankshafts for damping torsional and other vibrations although not necessarily limited thereto. My invention relates more particularly to improvements in vibration dampers which are ordinarily secured to the front end of engine crankshafts, the rear or opposite crankshaft end usually carrying the flywheel, such structures and arrangements in general being well known in the art.

It is an object of my invention to provide improved means for yieldingly connecting the inertia member of the damper to the crankshaft or damper hub, the latter being customarily employed for connecting the damper with the crankshaft, whereby torsional vibrations and other noise producing vibrations are dampened by reason of their being absorbed by the damper.

It is not broadly novel with my said invention to provide a yielding insert vulcanized in the damper organization, such construction being in use heretofore.

It is a further object of my invention to provide for an increased amount of contact, for a given space, between a yielding material such as rubber and the portions of the damper vulcanized thereto. Thus my damper is stronger and more efficient in operation. At the same time my damper can be manufactured at very low cost.

It is a further object of my invention to provide a yielding damper structure which is fixed against slipping between parts thereof which would give rise to objectionable wear and which does not require fastening devices for the yielding material.

I accomplish the aforesaid objects by vulcanizing a body of yielding material such as rubber intermediate co-operating undulated damper portions at a suitable point.

Referring to the accompanying drawing illustrating several embodiments of my invention, Fig. 1 is a sectional view through the damper, and Fig. 2 is an elevational view thereof.

In the drawing reference character A represents the vibration damper having a hub 10 suitably connected at 11 with the front end of the crank shaft 12. The inertia member 13 radially overlaps a cooperating disc or plate member 14 spaced axially from inertia member 13 and is rigidly secured by rivets 15 to the radially extending annular hub shoulder 16. The space between the members 13 and 14 is filled with an annulus 17 of yielding material preferably rubber. This rubber annulus is vulcanized in assembly with the opposed faces of the members 13 and 14 whereby there is no relative movement between the rubber annulus and the members 13 and 14, the rubber yielding internally sufficiently to accomplish the said object of my invention.

An important improvement provided by my invention resides in forming the members 13 and 14 where they overlap, with annular undulations indicated at B and C respectively. The undulations of each plate are preferably substantially sinuous in section (see Fig. 1) radially of the axis of hub 10. The annular peaks of one of said members are longitudinally aligned with the annular valleys of the other plate member and the rubber annulus 17 is preferably molded to fill the space between the members 13 and 14 and to conform with the undulations thereof as will be readily understood. By reason of the undulations as distinguished from flat parallel faces I have materially increased the area of vulcanized surface for a given available radial distance D for example. Thus the area of each vulcanized surface in my vibration damper structure is materially greater than the area determined by the distance D traced circumferentially of the disc. If desired the peaks and valleys may be formed by plane surfaces altho the curved form illustrated is preferred.

The art of vulcanizing rubber to metal is well known and may be readily practiced by those familiar with such art. My invention does not relate to improvements in the vulcanizing art per se but in the application thereof in a novel manner to the vibration damper art for the accomplishment of new and useful results.

One advantage of my invention in the embodiments illustrated over prior art devices resides in subjecting the yielding material such as rubber to a shearing action as distinguished from compression whereby the rubber will not tend to deteriorate as in the case of rubber under compression.

The undulation in the inertia member 13 may be readily formed by casting while those in the disc or plate member 14 may be formed by stamping, or by suitably machining the undulations in said members.

What I claim as my invention is:

1. A vibration damper comprising a hub structure having an annular shoulder, an undulated disc member secured to said shoulder, an inertia member having an undulated portion extending inwardly toward said hub structure in axially spaced relation with said disc member, and an annularly undulated annulus of rubber in said space vulcanized to said disc member and to said inertia member.

2. A vibration damper having a hub, a disc member rigidly secured to said hub, an inertia member, said members presenting radially overlapping opposed surfaces in axially spaced relation relative to the hub axis, said surfaces being annularly corrugated to provide annular peaks and valleys, and a rubber member vulcanized to said opposed surfaces, said rubber member having peaks and valleys complementary to those of said surfaces.

3. A vibration damper comprising a hub having a disc member secured thereto, an inertia member radially overlapping the disc member and spaced axially thereof, and a yielding element wave-like in radial cross-section providing concentric peaks and valleys, said element located intermediate the overlapping faces of said members and vulcanized thereto.

4. A vibration damper comprising a hub having a disc member secured thereto, an inertia member radially overlapping the disc member and spaced axially thereof, said members presenting axially spaced radially overlapping cooperating annularly corrugated complementary surfaces providing concentric peaks and valleys and undulated yielding means wave-like in radial cross-section between said cooperating overlapping complementary surfaces and vulcanized thereto.

5. A vibration damper comprising a hub having a disc member secured thereto, an inertia member radially overlapping the disc member and spaced axially thereof, said members presenting axially spaced radially overlapping cooperating annularly corrugated complementary cooperating surfaces, and yielding means wave-like in radial cross-section between said cooperating corrugated complementary surfaces and vulcanized thereto, said cooperating surfaces providing concentric complementary annular peaks and valleys.

6. A vibration damper comprising a hub having a disc member secured thereto, an inertia member radially overlapping and axially spaced from said disc member, said members each provided with annular corrugated cooperating surfaces wave-like in radial cross-section and providing concentric annular peaks and valleys, the concentric peaks and valleys of one member being complementary with and axially spaced from the concentric valleys and peaks of the other member respectively, and an undulated yielding means wave-like in radial cross-section located between the said spaced cooperating complementary undulating surfaces of said members and vulcanized thereto against relative surface movement.

WILLIAM W. HARRIS.